(12) United States Patent
Chang et al.

(10) Patent No.: US 8,368,661 B2
(45) Date of Patent: Feb. 5, 2013

(54) METHOD FOR FABRICATING TOUCH SENSOR PANELS

(75) Inventors: Shih Chang Chang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 851 days.

(21) Appl. No.: 12/502,192

(22) Filed: Jul. 13, 2009

(65) Prior Publication Data

US 2011/0006999 A1    Jan. 13, 2011

(51) Int. Cl.
*G06F 3/041*    (2006.01)
(52) U.S. Cl. ....................................................... 345/173
(58) Field of Classification Search .................. 345/173, 345/174, 82, 684
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,287,988 B1 * | 9/2001 | Nagamine et al. | 438/770 |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,787,253 B2 * | 9/2004 | Iwabuchi et al. | 428/698 |
| 7,015,894 B2 | 3/2006 | Morohoshi | |
| 7,184,064 B2 | 2/2007 | Zimmerman et al. | |
| 7,580,096 B2 * | 8/2009 | Yang | 349/113 |
| 7,663,607 B2 | 2/2010 | Hotelling et al. | |
| 7,719,496 B2 * | 5/2010 | Ahn et al. | 345/82 |
| 7,965,356 B2 * | 6/2011 | Yang | 349/113 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2010/0265188 A1 | 10/2010 | Chang et al. | |
| 2010/0295812 A1 * | 11/2010 | Burns et al. | 345/174 |
| 2011/0199700 A1 * | 8/2011 | Hirose et al. | 360/55 |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(Continued)

*Primary Examiner* — Fred Tzeng
(74) *Attorney, Agent, or Firm* — Morrison & Foerster LLP

(57) ABSTRACT

A method for manufacturing a patterned thin film layer on an uneven substrate is provided. The substrate having an outer surface and an inner surface. The method includes creating a cavity on the inner surface of the substrate, the cavity creating a cavity surface on a different plane as compared to the inner surface and a step between the cavity surface and the inner surface; forming a thin film layer on the inner surface of the substrate covering at least a part of the cavity surface, the step and the inner surface; performing laser ablation on the thin film layer to create patterns, at least some of which are created on the cavity surface, the step and the inner surface.

23 Claims, 7 Drawing Sheets

OTHER PUBLICATIONS

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

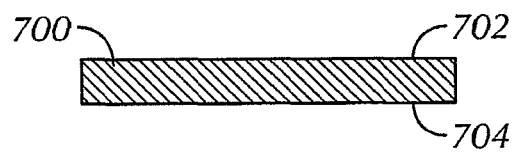
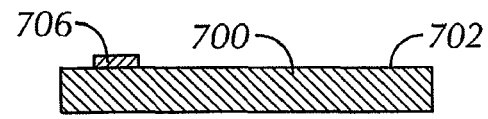
FIG. 7A    FIG. 7B
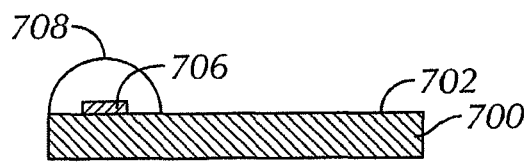
FIG. 7C    FIG. 7D
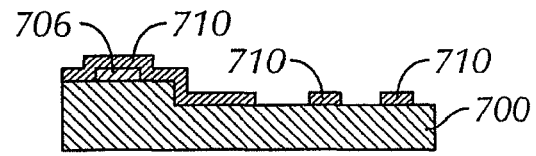
FIG. 7E    FIG. 7F

METHOD FOR FABRICATING TOUCH SENSOR PANELS

FIELD

This relates generally to fabricating a touch sensor panel, and more specifically, to a method of patterning thin film on a glass substrate with an uneven surface.

BACKGROUND

Many types of input devices are available for performing operations in a computing system, such as buttons or keys, mice, trackballs, joysticks, touch sensor panels, touch screens, and the like. Touch screens may come in a variety of forms, and can include a touch sensor panel, which may include a clear or transparent panel with a touch-sensitive surface, and a display device positioned partially or fully behind the touch sensor panel so that the touch-sensitive surface may cover at least a portion of the viewable area of the display device. Touch screens generally allow a user to perform various functions by touching the touch sensor panel (e.g., physical contact) or by placing a finger or other object near-field proximity to it (e.g., hovering over the touch sensor panel). In general, a computing system may register the touch event and may be capable of performing one or more actions based at least in part on registration of the touch event.

Touch screens, or devices that may incorporate, or be compatible with, touch screen technology, seem to be increasingly popular. Their popularity with consumers may be partly attributable to their relative ease or versatility of operation, as well as their declining price. In addition, touch screens may also be increasingly popular due, in part, to their generally decreasing overall size, their reliability, and their robustness. A corollary to these characteristics may be that, from a manufacturer's perspective, costs associated with producing devices including touch screens, or producing devices including touch screens with characteristics which are believed to be desirable for consumers, have decreased or become less onerous. Accordingly, there generally is a desire to continue to develop approaches or techniques believed to be desirable for consumers or end-users in terms of cost, performance or a combination thereof.

SUMMARY

Touch screens typically include a touch sensor panel affixed on top of or integrated with a display. One particular type of touch sensor panel discussed in detail in the description section below, without limitation, is an organic light emitting diode (OLED)-integrated touch sensor panel that includes a cover glass with a cavity positioned on top of an OLED structure. In some touch sensor panels, the cover glass can also serve as a touch substrate for the touch sensor panel by having patterned thin-film deposited on at least one of its surfaces. Conventionally, photolithography is used to create the patterns on the thin film. However, photolithography may not work well on uneven surfaces such as the surface of a cover glass having a cavity (a cavity glass).

Embodiments of the disclosure are directed to a method for patterning thin-film on a cavity glass. In particular, the conventional photolithography process is replaced by a laser ablation process to pattern indium tin oxide (ITO) film or other thin films on the surface of the cavity glass.

Specifically, an unprocessed cover glass unit can initially be provided. Both surfaces of the cover glass unit can be substantially flat and without any cavities at this initial stage. An optional metal processing step can be first performed on one or both surfaces of the cover glass. In some touch sensor panels, metal traces can be routed along the edge of the panels to connect sections of a particular drive or sense line. In those embodiments, a metal layer can be deposited on at least one of the surfaces of the cover glass (which also serves as the touch substrate in an OLED-integrated touch panel). Next, to create a cavity in the glass substrate, selective cavity glass etching can be performed on one surface of the glass substrate. A protective film layer can be temporarily affixed on part of the surface prior to the etching process to prevent that part of the surface from being etched. The protective film can be positioned over an end portion of the glass substrate where the metal layer has been deposited. It is to be understood that other protective films can be applied on other parts of the surface (e.g., a second protective film can cover the opposite end of the glass substrate) to protect those parts of the surface from being etched. As a result of the etching process, the part of the surface not protected by the protection film becomes lower than the part of the surface that was protected (i.e., a cavity is created).

Next, an ITO layer can be sputtered or otherwise formed on top of the cavity glass surface. If a metal layer was previously deposited, the ITO layer can also cover the metal layer where the two layers overlap. After the ITO layer is deposited, laser ablation can be performed on the ITO layer to create ITO patterns such as the drive and sense lines that form the touch pixels of the touch sensor panel. Because laser ablation does not require photoresist coating or a particular depth of focus as in conventional photolithography, it can be well suited for creating patterns on an uneven surface, such as a cavity glass surface. In some embodiments, the cover glass coated with ITO patterns can then be affixed to a corresponding thin-film transistor (TFT) glass to form an OLED structure.

In some embodiments, the process is directed to the fabrication of a cover glass that can also function as the touch substrate of a singled-sided ITO (SITO) touch sensor panel (i.e., a touch sensor panel with both the drive and sense lines formed on the same surface of a substrate). In other embodiments, it can be easily modified to fabricate cover glasses that are used in dual-sided ITO (DITO) touch sensor panels (i.e., touch sensor panels with drive and sense lines on opposite surfaces of the same substrate). For example, the flat surface of the cover glass can also be coated with a patterned layer of ITO before the etching step is performed. The patterned ITO layer on the flat surface may be protected by a protective film during the cavity glass etching process.

BRIEF DESCRIPTION OF THE DRAWINGS

FIGS. 7A-7F illustrate exemplary steps in the fabrication process of a cover glass for an OLED-integrated touch sensor panel according to embodiments of the disclosure.

DETAILED DESCRIPTION OF THE PREFERRED EMBODIMENTS

Figure 1:
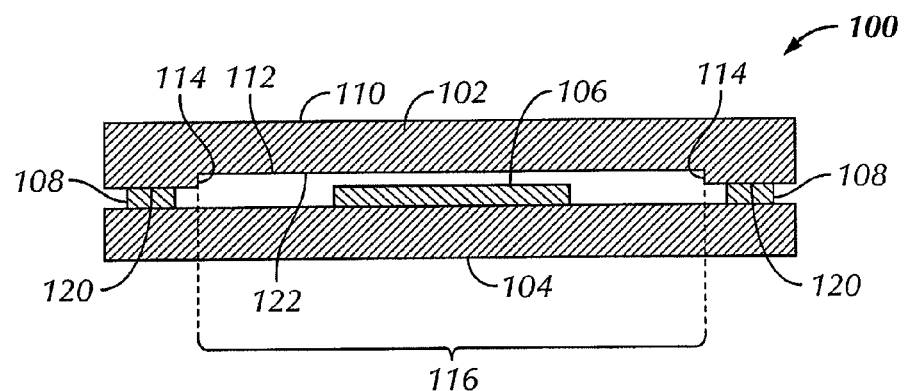
FIG. 1 illustrates a side view of an OLED structure including a cover glass and a TFT glass according to embodiments of the disclosure.

In the following description of preferred embodiments, reference is made to the accompanying drawings which form a part hereof, and in which it is shown by way of illustration specific embodiments in which the disclosure can be practiced. It is to be understood that other embodiments can be used and structural changes can be made without departing from the scope of the embodiments of this disclosure.

Embodiments of the disclosure are directed to a method for patterning thin-film on a cavity glass. In particular, laser ablation can be used to pattern indium tin oxide (ITO) film on the surface of the cavity glass. According to the disclosed embodiments, a substrate such as a cover glass unit can initially be provided with both surfaces substantially flat. An optional metal processing step can first be performed on one or both surfaces of the cover glass. For example, in some touch sensor panels, metal traces can be routed along the edge of the panels to connect particular drive or sense lines. In such embodiments, a metal layer can be deposited on at least one of the surfaces of the cover glass. A protective film layer can be temporarily affixed on part of the surface prior to the etching process to prevent the metal from being etched. Next, to create a cavity in the glass substrate, selective cavity glass etching can be performed on one surface of the glass substrate.

An ITO layer can then be sputtered or otherwise formed on top of the cavity glass surface. If a metal layer was previously deposited, the ITO layer can also cover the metal layer where the two layers overlap. After the ITO layer is deposited, laser ablation can be performed on the ITO layer to create ITO patterns such as the drive and sense lines that form the touch pixels of the touch sensor panel. Because laser ablation does not require photoresist coating or a particular depth of focus as in conventional photolithography, it can be well suited for creating patterns on an uneven surface, such as a cavity glass surface.

In some embodiments, the process is directed to the fabrication of a cover glass that can also function as the touch substrate of a singled-sided ITO (SITO) touch sensor panel (i.e., a touch sensor panel with both the drive and sense lines formed on the same surface of a substrate). In other embodiments, it can be easily modified to fabricate cover glasses that are used in dual-sided ITO (DITO) touch sensor panels (i.e., touch sensor panels with drive and sense lines on opposite surfaces of the same substrate). For example, the flat surface of the cover glass can also be coated with a patterned layer of ITO before the etching step is performed. The patterned ITO layer on the flat surface may be protected by a protective film during the cavity glass etching process.

One type of touch screen includes a touch sensor panel integrated with or in direct physical contact with an organic light emitting diode (OLED) structure in a module or integrated circuit (IC). In this context, a touch sensor panel may refer to a configuration of touch sensors, including a surface, in which touch sensors of the configuration are responsive to direct physical contact with the surface (e.g., touching) or objects in close proximity to the surface (e.g., hovering over the surface). The fabrication and structure of exemplary touch sensor panel integrated with an OLED structure are disclosed in detail in U.S. patent application Ser. No. 12/426,912, which is incorporated by reference in its entirely herein.

In one embodiment, a touch sensor panel may include an array of touch sensors integrated with an array of OLED pixels in a module or in an integrated circuit (IC). The detection of a touch event by one or more touch sensors may be sensed by sense circuitry and processed or otherwise interpreted. The interpreted touch data may result in a processor or other circuit electrically activating OLED pixels of the array to change the display. OLED structures may provide potential advantages over possible alternative display technologies, depending at least in part on the particular application. For example, OLED structures typically do not employ light valves or similar technology. However, it should be understood that although embodiments of the disclosure may describe and illustrate OLED embodiments, the disclosed embodiments are not so limited, but include other display technologies and other technologies in general where patterning thin-films on uneven surfaces is required.

FIG. 1 illustrates a simplified side view of a section of an OLED-integrated touch sensor panel 100. The OLED integrated touch sensor panel 100 includes a cover glass 102 on top of a thin film transistor (TFT) glass 104. The cover glass 102 may include one top flat surface 110 and a bottom surface 112 that defines a cavity 116 in the cover glass 102. The cavity can provide additional space between the cover glass 102 and the TFT glass 104 once the two layers are sealed together to form a touch sensor panel, as detailed below. Because the cavity 116 is formed in the middle portion 122 of the cover glass 102, the two ends of the cover glass 102 are slightly thicker than the middle portion of the cover glass 102. Thus, a "step" 114 is formed between the lower end portions 120 of the bottom surface 112 and the slightly higher middle portion 122 of the bottom surface 112. In one embodiment, the thicker portion (i.e., both ends) of the cover glass may have a thickness of 0.42 mm and the middle portion of the cover glass may have a thickness of 0.38 mm. Accordingly, the step 114 between the end portions and the middle portion of the cover glass 102 may have a depth of approximately 0.04 mm in this embodiment. Although the step 114 (i.e., the wall) of the cavity 116 is shown in FIG. 1 to be substantially perpendicular to the middle portion 122 and both end portions 120 of the bottom surface 114 of the glass cover 102, it is to be understood that the cavity 116 can have sloping walls.

Figure 2:
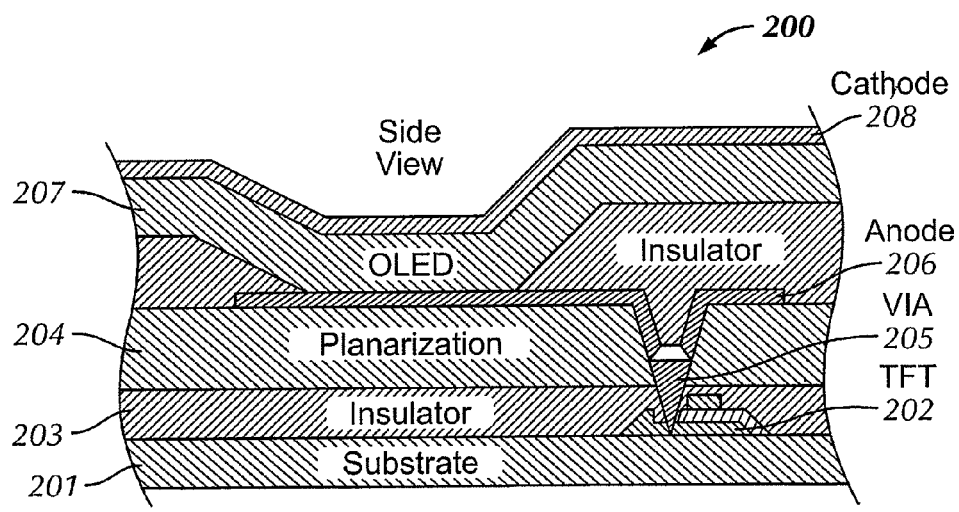
FIG. 2 is a side view illustrating a structure of an exemplary TFT glass according to embodiments of the disclosure.

The TFT glass 104 may be a glass substrate with TFTs (not shown in FIG. 1) formed on top of it. A layer of OLED 106 may be applied or deposited over the TFTs on top of the glass substrate. FIG. 2 illustrates an exemplary structure of the TFT glass 200 including the OLED layer 207. This particular embodiment of the TFT glass 200 includes an OLED structure that may be referred to as an anode-common structure; though the scope of the claimed subject matter may include any or all variations of OLEDs, including, but not limited to, cathode-common structure, dual-plate OLED (DOD) structures, active or passive matrix OLED structure, and the like. The TFT glass 200 may include a base substrate 201. A transistor, such as TFT 202, may be formed on the base substrate 201. Fabrication of transistors is a well understood technology and therefore will not be discussed at length herein. An insulating layer 203 may be formed over the transistors. This insulating layer 203 may assist in lessening electrical interference, such as parasitic interference, at the TFTs or other electrical components that may be fabricated within the TFT glass 104. A planarization layer 204 may form a substantially planar surface on top of the insulating layer 203 for additional layers to be deposited on top of it. A via 205 may be formed and filled with conductive material, such as metallization. An OLED layer may be applied or deposited over the metallization, forming anode 206. Another metallization layer on top of the OLED layer 207 can form a cathode 208. Insulation material may be provided to fill gaps in the OLED structure between the portion of the structure including an array of OLED pixels to form the OLED display and the portion of the structure including an array of transistors to drive the OLED pixels. The driving transistors can be the TFTs 202 underneath the OLED layer 207. The OLED pixels may include a red pixel, a green pixel, and a blue pixel.

Referring again to FIG. 1, the cover glass 100 can provide protection for the OLED layer 106 on the TFT glass 104. During the manufacturing process, the cover glass 102 and the TFT glass 104 can be sealed together at their edges with a sealant 108 so that the OLED layer is enclosed in the sealed space between the cover glass 102 and the TFT glass 104. This protects the OLED layer from being damaged by excessive moisture or dust in the air outside of the sealed space between the layers. Because the OLED layer 106 protrudes from the top surface of the TFT glass 104, the cavity 116 in the glass cover 102 is designed to offer extra space between the cover glass 102 and the TFT glass 104 to accommodate the OLED layer 106 on top of the TFT glass 104 so that the OLED layer 106 does not come in contact with the bottom surface 112 of the cover glass 102.

Figure 3:
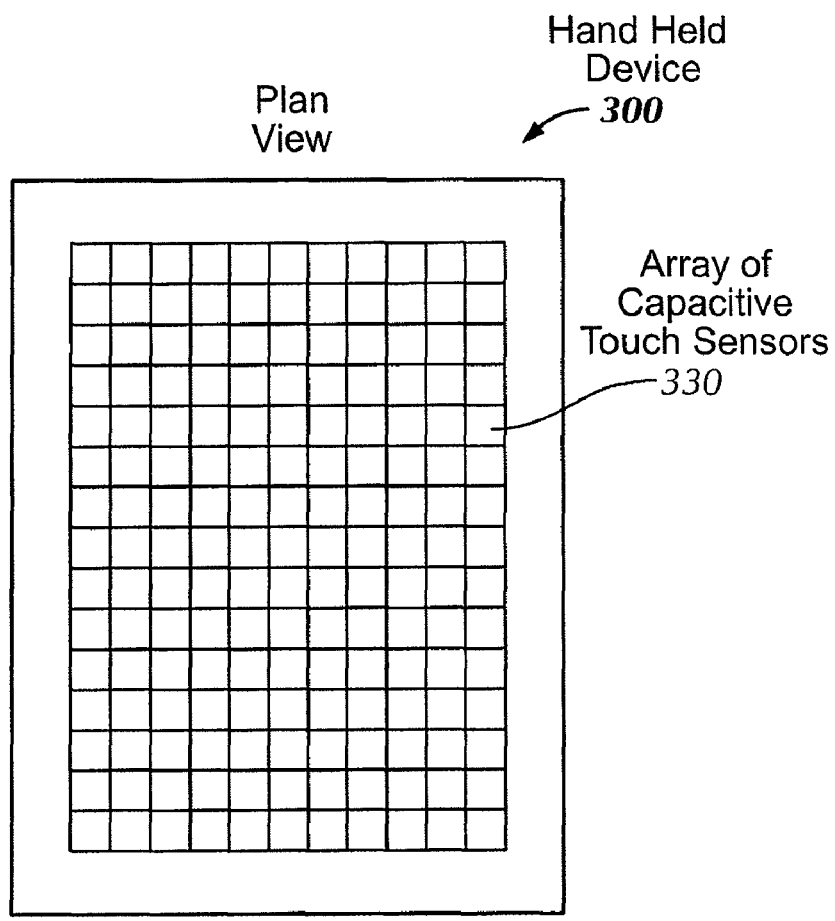
FIG. 3 illustrates a hand held device embodiment including a capacitive touch sensor panel formed by an array of capacitive touch sensors under a surface of a display.

The OLED structure illustrated in FIG. 1 may be used in various types of touch sensor panels such as capacitive touch sensor panels. FIG. 3 illustrates a hand-held device embodiment 300 including an exemplary capacitive touch sensor panel formed by an array of capacitive touch sensors 330 under a surface of a display (e.g., a touch glass). For this particular embodiment, a configuration of touch sensors having respective touch sensing locations may be formed. For example, one or more electrical structures may include a pattern of conductive traces (e.g., drive and sense lines) arranged in a manner so as to sense a change in capacitance which may be occasioned by an object, such as a finger, touching, contacting or hovering over a touch sensitive surface. As an object approaches a touch sensitive surface, one or more touch sensors of the configuration at particular touch sensing points or locations may experience a change in capacitance occasioned by proximity to the object. By detecting a change in capacitance at one or more touch sensing points or locations, and by noting the particular location or position associated with the change in capacitance, a sensing circuit may detect and register one or more touch events, such as, for example, an image of touch. After being detected and registered, touch events may be processed or otherwise used to at least in part control operation of an electronic device, such as for one or more operations of hand held-device 300, by way of example. It is noted that throughout this specification, with respect to the operation of a touch sensor, the terms sensing points, sensing locations, touch point, touch locations or the like are used interchangeably.

Depending on the type of touch sensor panel to be fabricated, the touch substrate of the panel may need to include thin film layers on one or both of its surfaces. In some configurations, touch sensor panels can be implemented as an array of pixels formed by multiple drive lines (e.g. rows) crossing over multiple sense lines (e.g. columns), where the drive and sense lines are separated by a dielectric material. In some touch sensor panels, the drive and sense lines can be formed on the top and bottom sides of the touch substrate of the panel. In other touch sensor panels, the drive and sense lines may be formed on one side of the touch substrate of the panel. The sense lines and drive lines can be formed from a substantially transparent material such as ITO, although other materials can also be used. The ITO layer(s) can be deposited on one or both sides of the touch substrate of the panel.

Figure 4:
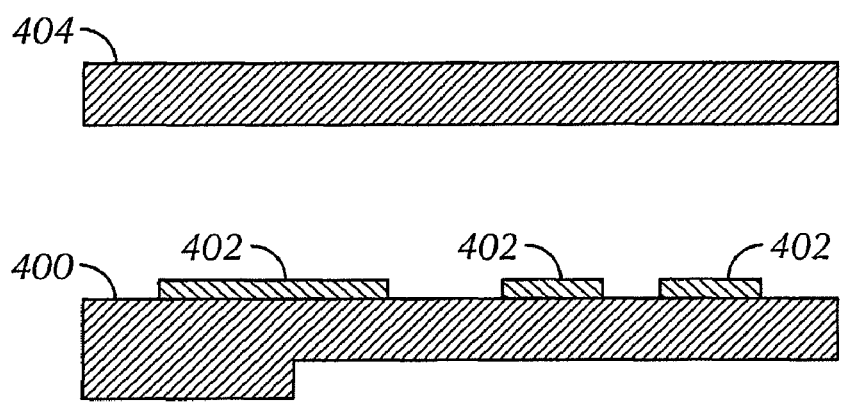
FIG. 4 is a side view of a section of a cover glass of an OLED-integrated touch sensor panel having ITO patterns formed on its top surface according to embodiments of the disclosure.

In one SITO touch sensor panel embodiment, the OLED structure of FIG. 1 may be used as the underlying touch substrate. In particular, the touch sensor patterns (i.e., drive and sense lines) can be formed on the cover glass of the OLED structure instead of on a separate layer of substrate. By eliminating the extra layer, the touch screen can be made thinner and lighter, and thus more user-friendly. To illustrate how a cover glass can be used as the touch substrate in a touch screen, an enhanced view of a section of the cover glass in the OLED-integrated panel of FIG. 1 is provided in FIG. 4. In this embodiment, an ITO layer 402 is deposited on top of the cover glass 400. The ITO layer 402 can be patterned to form a configuration of drive and sense lines for detecting and providing location information of touches on the outer surface of touch glass 404, which is shown to be above the cover glass 400 in FIG. 4. The touch glass 404 can serve as a layer of protection for the ITO layer 402 on top of the cover glass 400. It should be understood that the term cover glass 400 as used with respect to FIG. 4 is intended to mean that it "covers" a display below it, and that the surface exposed to the environment is the outer surface of the touch glass 404.

Figure 5:
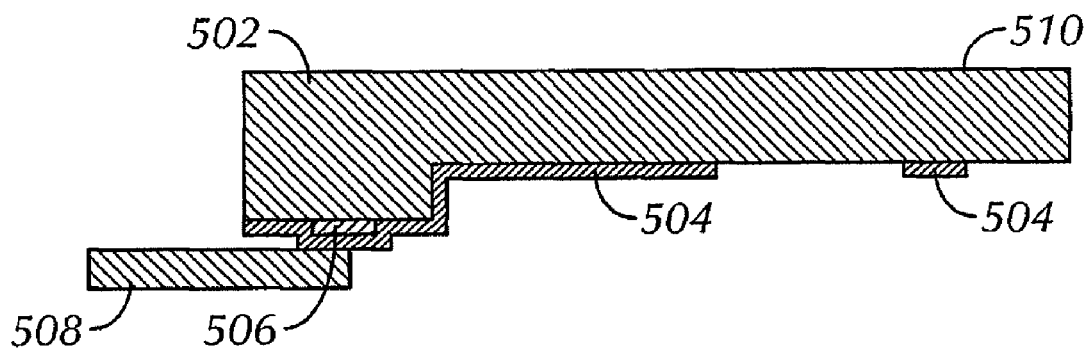
FIG. 5 is a side view of a section of a cover glass of an OLED-integrated touch sensor panel having ITO patterns formed on its bottom surface according to embodiments of the disclosure.

However, if the ITO layer is formed on the top surface of the cover glass 400, the cover glass 400 cannot undergo a thinning process to reduce its thickness because the ITO layer would likely be damaged or destroyed during such a process. Thus, in some embodiments, the ITO layer is deposited on the bottom surface of the cover glass 502 as shown in FIG. 5. An optional metal layer 506 may be first deposited on the bottom surface of the cover glass 502. As illustrated, the metal layer may be only deposited on the thick end portion of the glass. Next, an ITO layer 504 can be sputtered or otherwise formed on top of the metal layer 506. In contrast to the metal layer 506, the ITO layer 504 may extend to cover a significant part of the bottom surface including the cavity.

By depositing both the metal layer 506 and the ITO layer 504 on the bottom surface of the cover glass 502, the top surface 510 can remain flat and unprocessed. This allows a thinning process to be performed on the top surface to reduce the overall thickness of the cover glass 502. In addition, because the metal layer 506 and the ITO layer 504 are coated on the bottom surface of the cover glass 502, only one flexible printed circuit (FPC) 508 may be needed to be bonded to the edge of the conductive ITO layer to receive data on capacitance changes detected at different touch pixels of the touch panel.

Drive and sense lines can be formed by patterning the ITO layer. The conventional method used to create patterns on the ITO layer 504 is to perform photolithography on the surface coated with ITO to remove parts of the ITO layer 504. The conventional photolithography method is well known in the art and works well on ITO films coated on flat surfaces. Nevertheless, it may be difficult to perform photolithography on a cavity glass surface such as the bottom surface of the cover glass 502 shown in FIG. 5. This is in part because photolithography requires a photoresist coating on the target surface and the coating cannot be laid uniformly if the target surface is uneven, (e.g., the uneven surface of a cavity glass). In addition, the depth of focus (DOF) of the exposure equipment used in a photolithography process may be set to less than the depth of the cavity, causing poor exposure on the cavity surface. Accordingly, photolithography may not be ideal for patterning an ITO layer on an uneven surface, such as a surface of a cavity glass.

Embodiments of the disclosure are directed to a new solution for patterning thin-film on a cavity glass. In particular, the conventional photolithography process is replaced by laser ablation during the fabrication of substrates such as OLED-integrated touch sensor panels to pattern ITO film on the surface of the cavity cover glass of the OLED structure.

Laser ablation is well known and has a number of applications in various industries such as sub-contract micromachining, laser micro drilling, fuel injector production, laser micro-cutting, etc. It has also been used for patterning thin films to produce small features or isolate regions within a device. Applications of laser ablation of thin films include production of photovoltaic cells (e.g., amorphous silicon) and flat panel displays (e.g., ITO patterning). Laser ablation can be an ideal process for production of fine features in materials such as silicon and ITO. When in use, a short pulse laser is focused onto the surface to be ablated. The material heats up very rapidly and vaporizes to leave a small pit in the surface. By appropriate choice of laser wavelength, pulse duration and pulse energy, the material removal can be restricted to the surface layer (e.g., the removal of ITO from a glass substrate).

Figure 6:
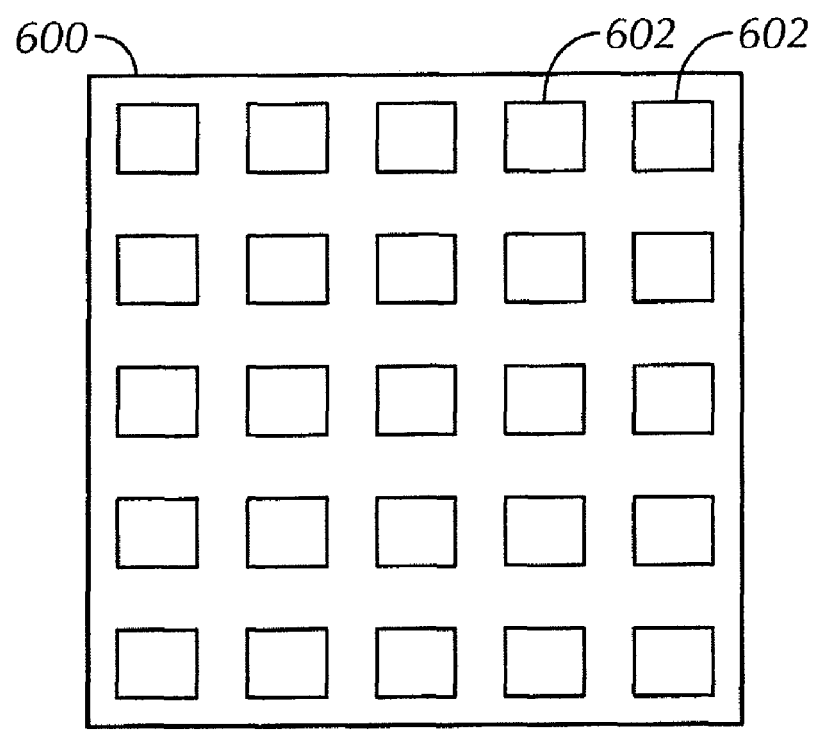
FIG. 6 is a plan view of an exemplary cover glass mother sheet including a plurality of unprocessed glass units to be used in the fabrication process disclosed in embodiments of the disclosure.

The following embodiments of the disclosure include a laser ablation step specifically for patterning thin films on a cavity glass. FIG. 6 illustrates a cover glass mother sheet 600 including a plurality of unprocessed glass units 602. FIGS. 7A-7F illustrate an exemplary fabrication process of a cover glass for an OLED structure in a touch sensor panel from one of those unprocessed glass units 602 in the mother sheet 600.

FIG. 7A provides a side view of the one of the plurality of cover glass units 700 in the mother sheet 600. In this embodiment, both surfaces 702, 704 of the cover glass unit 700 can be substantially flat and without any cavities at this initial stage. An optional metal processing step is illustrated in FIG. 7B. In some touch sensor panels, metal traces are routed along the edge of the panels to connect sections of a particular drive or sense line. In those embodiments, a metal layer 706 can be deposited on at least one of the surfaces 702, 704 of the cover glass (which also serves as part of the touch substrate in an OLED-integrated touch panel), as illustrated in FIG. 7B. Next, to create a cavity in the glass substrate 700, selective cavity glass etching can be performed on one surface 702 of the glass substrate 700. A protective film layer can be temporarily affixed on part of the surface prior to the etching process to prevent that part of the surface from being etched. In the embodiment illustrated in FIG. 7C, the protective film 708 is positioned over one end portion of the glass substrate 700 where the metal layer 706 has been deposited. Although a protective film is only shown to be applied on top one end of the surface in FIG. 7C, it is to be understood that other protection films can be applied on other parts of the surface (e.g., a second protective film can cover the opposite end of the glass substrate) to protect those parts of the surface from being etched. FIG. 7D illustrates the glass substrate 700 after the cavity glass etching process. As a result of the etching process, the part of the surface 702 not protected by the protection film 708 is now lower than the part of the surface that was protected. In other words, a cavity has been formed. As described above, the cavity is created to offer additional space between the cover glass and the OLED coated TFT glass layer after they are sealed together.

Next, as illustrated in FIG. 7E, an ITO layer can be sputtered or otherwise formed on top of the surface 702. If a metal layer 706 was previously deposited, the ITO layer can also cover the metal layer 706 where the two layers overlap. After the ITO layer is deposited, laser ablation can be performed on the ITO layer 710 to create ITO patterns that, in some embodiments, can be the drive and sense lines that form the touch pixels of the touch sensor panel. Because laser ablation does not require photoresist coating or a particular depth of focus as in the conventional photolithography, it can be well suited for creating patterns on an uneven surface, such as the cavity glass surface of FIG. 7F. The cover glass 700 coated with ITO patterns can then be affixed to a corresponding TFT glass to form the OLED structure illustrated in FIG. 1.

Although the process illustrate in FIGS. 7A-7F is directed to the fabrication of a cover glass for use as the touch substrate of a SITO touch sensor panel (i.e., a touch sensor panel with both the drive and sense lines on the same surface), it can be easily modified to fabricate cover glasses that are used in DITO touch sensor panels (i.e., touch sensor panels with drive and sense lines on opposite surfaces). For example, the flat surface 704 of the cover glass 702 can be coated with a patterned layer of ITO before the steps illustrated in FIGS. 7B-7F are performed. The patterned ITO layer on the flat surface 704 may be protected by a protective film during the cavity glass etching process of FIG. 7C.

Although it is specifically disclosed above that laser ablation can be used to pattern an ITO layer on a surface of a cavity cover glass for an OLED-integrated touch sensor panel, it is to be understood that the use of laser ablation can be extended to any uneven surface of any substrate where the conventional photolithography process cannot achieve ideal results.

Figure 8A:
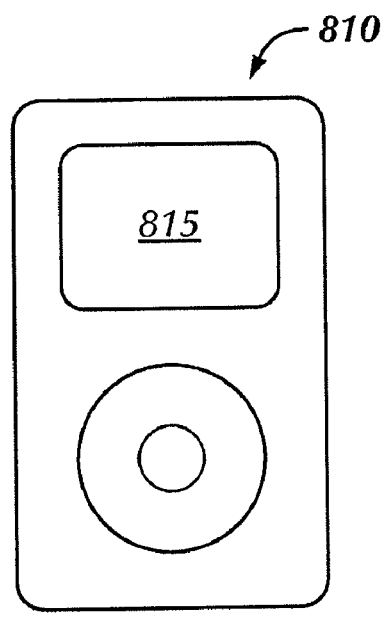
FIG. 8A illustrates an exemplary digital media player having a SITO or DITO touch sensor panel including a cover glass fabricated according to embodiments of the disclosure.

FIG. 8A illustrates exemplary digital media player 810 that can include a touch sensor panel 815 including a cavity cover glass fabricated according to embodiments of the disclosure.

Figure 8B:
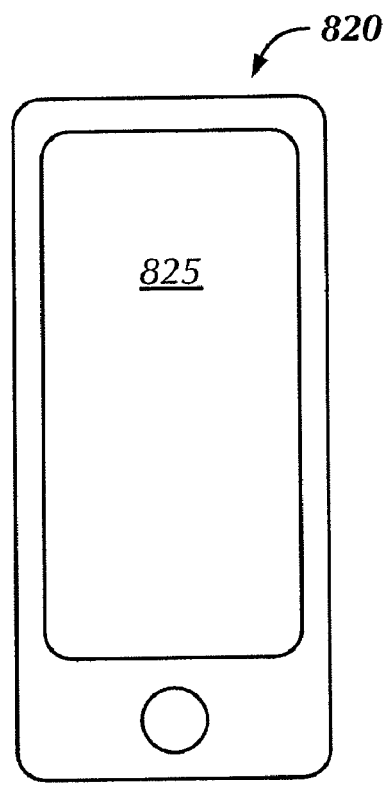
FIG. 8B illustrates an exemplary mobile telephone having a SITO or DITO touch sensor panel including a cover glass fabricated according to embodiments of the disclosure.

FIG. 8B illustrates exemplary mobile telephone 820 that can include a touch sensor panel 825 including a cavity cover glass fabricated according to embodiments of the disclosure.

Figure 8C:
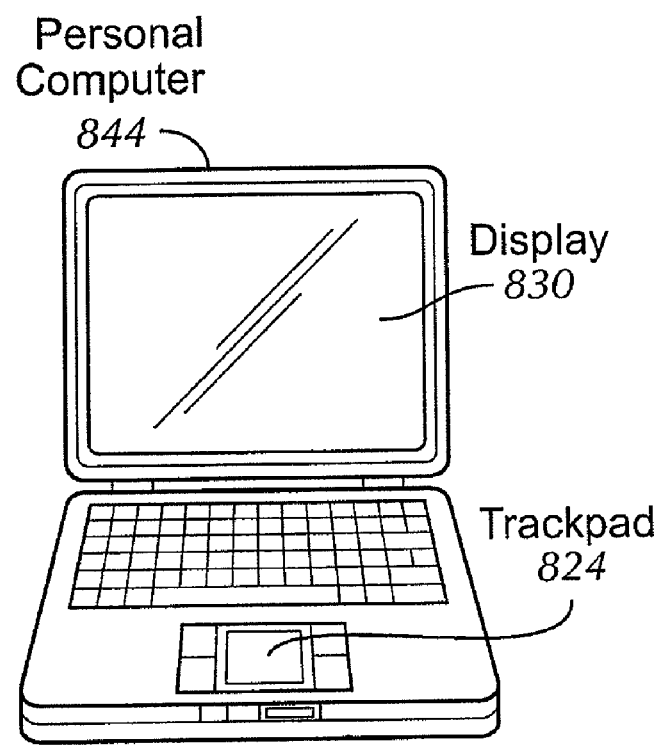
FIG. 8C illustrates an exemplary mobile computer having a SITO or DITO touch sensor panel including a cover glass fabricated according to embodiments of the disclosure.

FIG. 8C illustrates an exemplary personal computer 844 that can include touch sensor panel 824 and display device 830. The touch sensor panel 824 can include a cavity cover glass fabricated according to embodiments of the disclosure.

Figure 8D:
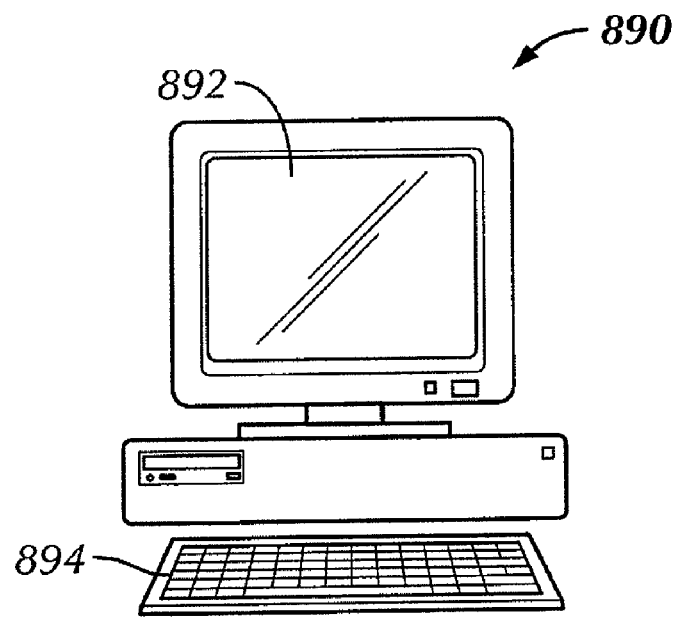
FIG. 8D illustrates an exemplary desktop computer having a SITO or DITO touch sensor panel including a cover glass fabricated according to embodiments of the disclosure.

FIG. 8D illustrates a desktop computer 890 including a display device 892. The display device 892 may include a touch sensor panel including a cavity cover glass fabricated according to embodiments of the disclosure. The desktop computer 890 may also include a virtual keyboard 894 which incorporates a touch sensor panel fabricated according to embodiments of the disclosure.

Figure 9:
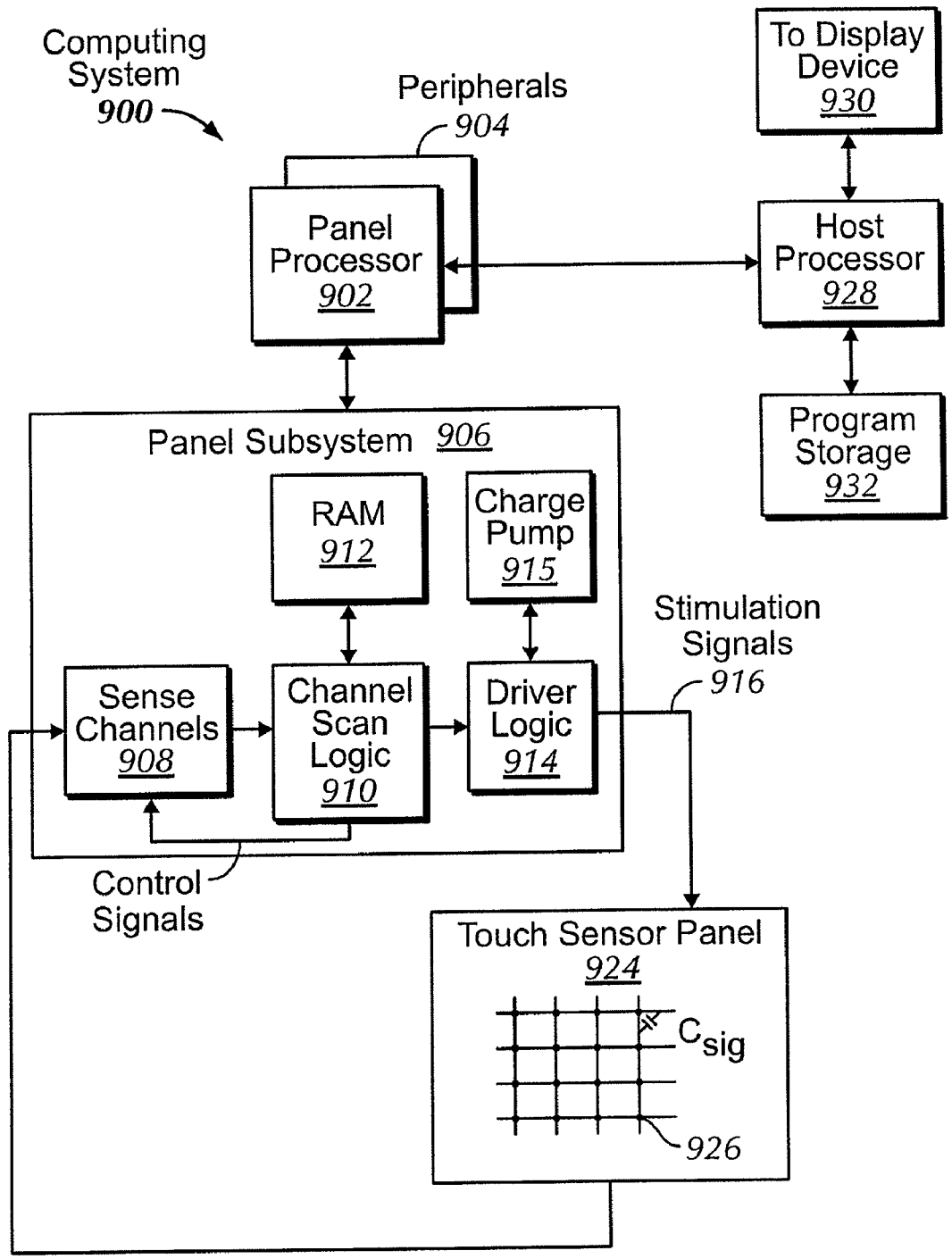
FIG. 9 illustrates an exemplary computing system including a touch sensor panel including a cover glass fabricated according to embodiments of the disclosure.

FIG. 9 illustrates exemplary computing system 900 that can include one or more touch sensor panels fabricated according to the embodiments of the disclosure described above. Computing system 900 can include one or more panel processors 902 and peripherals 904, and panel subsystem 906. Peripherals 904 can include, but are not limited to, random access memory (RAM) or other types of memory or storage, watchdog timers and the like. Panel subsystem 906 can include, but is not limited to, one or more sense channels 908, channel scan logic 910 and driver logic 914. Channel scan logic 910 can access RAM 912, autonomously read data from the sense channels and provide control for the sense channels. In addition, channel scan logic 910 can control driver logic 914 to generate stimulation signals 916 at various frequencies and phases that can be selectively applied to drive lines of touch sensor panel 924. In some embodiments, panel subsystem 906, panel processor 902 and peripherals 904 can be integrated into a single application specific integrated circuit (ASIC).

Touch sensor panel 924 can include a capacitive sensing medium having a plurality of drive lines and a plurality of sense lines, although other sensing media can also be used. Either or both of the drive and sense lines can be coupled to a thin glass sheet according to embodiments of the disclosure. Each intersection of drive and sense lines can represent a capacitive sensing node and can be viewed as picture element (pixel) 926, which can be particularly useful when touch sensor panel 924 is viewed as capturing an "image" of touch. (In other words, after panel subsystem 906 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 924 can drive sense channel 908 (also referred to herein as an event detection and demodulation circuit) in panel subsystem 906.

Computing system 900 can also include host processor 928 for receiving outputs from panel processor 902 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 928 can also perform additional functions that may not be related to panel processing, and can be coupled to program storage 932 and display device 930 such as an LCD panel for providing a UI to a user of the device. Display device 930 together with touch sensor panel 924, when located partially or entirely under the touch sensor panel, can form touch screen 918.

Note that one or more of the functions described above can be performed by firmware stored in memory (e.g. one of the peripherals 904 in FIG. 9) and executed by panel processor 902, or stored in program storage 932 and executed by host processor 928. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A method for manufacturing a patterned thin film layer on an uneven substrate, the substrate having an outer surface and an inner surface, the method comprising:
   creating a cavity on the inner surface of the substrate, the cavity creating a cavity surface on a different plane as compared to the inner surface and a step between the cavity surface and the inner surface;
   forming a thin film layer on the inner surface of the substrate covering at least a part of the cavity surface, the step and the inner surface;
   performing laser ablation on the thin film layer to create patterns, at least some of which are created on the cavity surface, the step and the inner surface.

2. The method of claim 1, wherein creating a cavity is by performing glass etching on the inner surface of the substrate.

3. The method of claim 1, further comprises adding a temporary protective layer over a part of the inner surface before creating the cavity on the inner surface; and removing the temporary protective layer after the cavity is created.

4. The method of claim 1, further comprises depositing one or more layers on the outer surface of the cover glass, wherein one of the one or more layers is a patterned thin film layer, and wherein the patterned thin film layer on the outer surface and the thin film layer on the inner surface, step and cavity surface of the cover glass form a plurality of touch sensors.

5. The method of claim 1, further comprising thinning the substrate.

6. The method of claim 1, further comprising bonding a flexible printed circuit (FPC) to the thin film layer.

7. The method of claim 1, wherein the substrate is a cover glass for an OLED display.

8. The method of claim 7, wherein attaching the cover glass to the OLED display further comprises sealing the cover glass and the OLED display at their edges.

9. The method of claim 7, wherein the OLED display comprises an OLED layer deposited on top of a TFT glass.

10. The method of claim 9, wherein the OLED layer is partially accommodated in a space created by the cavity when the cover glass and the OLED display are sealed against each other.

11. The method of claim 9, wherein the TFT glass comprises a plurality of transistors connected to an array of OLED pixels so as to electrically drive pixels of the array.

12. The method of claim 11, wherein the plurality of touch sensors is integrated within a single module with the array of OLED pixels.

13. The method of claim 9, wherein the OLED layer is sandwiched between two conductive layers.

14. The method of claim 1, further comprising incorporating the substrate with a display to form a touch screen.

15. The method of claim 1, further comprising incorporating the substrate into a mobile telephone.

16. The method of claim 1, further comprising incorporating the substrate into a media player.

17. The method of claim 1, further comprising incorporating the substrate into a media player.

18. A device having thin-film traces patterned over uneven surfaces of a substrate, the device formed by a method comprising:

creating a cavity in a inner surface of the substrate, the cavity forming a cavity surface on a different plane as compared to the inner surface and a step between the cavity surface and the inner surface;

forming a thin film layer over at least a portion of the inner surface, the step and the cavity surface; and performing laser ablation on the thin film layer to create patterns that traverse at least a portion of the inner surface, the step and the cavity surface.

19. The device of claim 18, wherein the method further comprises adding a temporary protective sheet over a part of the inner surface before creating the cavity on the inner surface; and removing the temporary protective sheet after the cavity is created.

20. The device of claim 18, wherein the method further comprises depositing one or more layers on the outer surface of the cover glass, wherein one of the one or more layers is a patterned thin film layer, and wherein the patterned thin film layer on the outer surface and the thin film layer on the inner surface, step and cavity surface of the cover glass form a plurality of touch sensors.

21. The device of claim 18, wherein the method further comprises thinning the substrate.

22. The device of claim 18, wherein the method further comprises bonding a flexible printed circuit (FPC) to the thin film layer.

23. The device of claim 18, wherein creating a cavity is by performing glass etching on the inner surface of the substrate.

* * * * *